United States Patent [19]

Herbst

[11] 4,060,265
[45] Nov. 29, 1977

[54] PIPE CONSTRUCTION

[76] Inventor: Donald Herbst, Marienplatz 11, 1 Berlin 45, Germany

[21] Appl. No.: 613,487

[22] Filed: Sept. 15, 1975

[30] Foreign Application Priority Data

Nov. 25, 1974 Germany .............................. 2456070

[51] Int. Cl.² ............................................. F16L 23/00
[52] U.S. Cl. .................................... 285/405; 285/424
[58] Field of Search .............. 285/416, 424, 176, 405, 285/412, 363, 368

[56] References Cited

U.S. PATENT DOCUMENTS

| 652,396 | 6/1900 | Lovekin | 285/368 X |
|---|---|---|---|
| 1,015,312 | 1/1912 | Gray | 285/405 X |
| 1,440,273 | 12/1922 | Carman | 285/424 X |
| 1,450,826 | 4/1923 | Walten | 285/424 X |
| 1,595,564 | 8/1926 | Neuhaus | 285/416 |
| 1,815,840 | 7/1931 | Frank | 285/412 X |
| 2,627,430 | 2/1953 | Koffler | 285/424 X |
| 2,656,594 | 10/1953 | Westling | 285/416 X |
| 3,322,444 | 5/1967 | Sewell et al. | 285/416 X |
| 3,432,185 | 3/1969 | Rosengren | 285/424 X |
| 3,712,650 | 1/1973 | Mez | 285/424 X |
| 3,794,363 | 2/1974 | Schulz | 285/368 X |
| 3,800,846 | 4/1974 | Kurz | 285/424 X |
| 3,811,714 | 5/1974 | Pintard | 285/424 X |

FOREIGN PATENT DOCUMENTS

| 1,507,493 | 11/1967 | France | 285/416 |
|---|---|---|---|
| 254,375 | 3/1964 | Netherlands | 285/416 |
| 781,144 | 8/1957 | United Kingdom | 285/368 |

Primary Examiner—Thomas F. Callaghan
Attorney, Agent, or Firm—Andrew R. Basile

[57] ABSTRACT

A piping system consisting of individual pipe sections which are of rectangular cross-section and can be joined by flanges, characterized by the fact that the individual pipe sections are provided in their corner areas with a curvature radius which allows for a contiguous, outward directed edge and that the flanges used to join the individual sections consist of a frame which snugly fits to the outside wall of each individual pipe section and can be formed by suitably bending a common angle piece; and that said enclosing frame is sealed.

1 Claim, 5 Drawing Figures

PIPE CONSTRUCTION

BACKGROUND OF THE INVENTION

I. Field of the Invention

The invention pertains to piping consisting of individual pipe sections of rectangular cross-section connected by flanges.

II. Description of the Prior Art

Heretofore individual pipe sections consisted of sheet metal having connecting flanges at each end which are in the shape of a frame and of an angular profile. The flange frame consists of four rods which are mitre-cut, angular profiled, and joined to each other by welding.

Manufacture of these well-known flange frames from welded angular rods requires considerable expenditures in view of the fact that the side pieces of the flange frame, which are perpendicular to the walls of the individual pipe section, must have a surface which is suitable for tightly joining two adjacent individual pipe sections. For this reason the welding must be carried out with special care. Additionally, welding invariably causes some distortion at the weld location necessitating a post finishing operation at the surface of the flange frame which is to provide the tight seal.

Because of these inherent disadvantages in the manufacture of flange frames for rectangular cross-section piping, new methods have been searched to obtain a flange frame for which the welding operation is no longer required. To form such a frame, a hollow section is used; characterized by a linear side leg which lies alongside the interior wall of the individual pipe section and has another side leg which is vertical to the first and provides the sealing surface of the flange frame. The latter side leg is bent back parallel to the interior side leg, forming a slot, into which the wall of the individual pipe section can be inserted. Four pieces profiled in this manner are cut to the respective lengths of the rectangular sides of the pipe section, slipped onto the four side walls, and fastened there. The free corners are then covered by four angular corner pieces so that in the end a flange frame is provided which completely encircles the pipe. The angular corner pieces are provided with perforations used for the joining of two adjacent pipe sections. This familiar design of a flange frame indeed makes the welding superfluous and, thus, avoids the above-mentioned disadvantages, but is instead complicated in structural features, requires considerable expenditure in manufacturing the individual components, and requires a considerable assembly effort. In addition, such a composite flange frame requires the sealing of the locations where the vertical and horizontal side pieces are joined by the angular corner pieces, otherwise no tight seal can be guaranteed between individual pipe sections.

SUMMARY OF THE INVENTION

It is thus the object of this invention to overcome the disadvantages inherent in the state of the art methods of assembling flange frames for rectangular pipe sections by providing a flange frame which can be manufactured by only welding at one location, which can be manufactured by simple bending operations carried out on a suitable conventional angle piece, and which can be installed in a simple manner.

This task is achieved according to the instant invention by the fact that the individual pipe sections have a radius of curvature in the corner region which allows for a contiguous, outward directed flanging. The flanges needed for the joining of the individual pipe sections consist of a frame which snugly fits the exterior wall of each individual pipe section. The flanges are formed by the bending of an angle piece that is welded to form the frame. Since in accordance with the invention, the individual pipe section in the corner region is not sharp edged, but rather is of such a radius of curvature that on bending the edge outwardly a contiguous border is formed. The flange frame can be formed from a conventional angle piece by a respective bending operation out of one piece. The two ends of the piece are then capable of being joined to each other by welding at a location between two adjoining corners. In this manner a simple encircling flange frame is produced which has a front surface suitable for joining individual pipe sections and which can be easily mounted on each individual pipe section.

It is a further characteristic of the invention that on both ends of each individual pipe section an outward directed edge is provided, obtained by bending, and completely encircling the pipe and capable of providing a bracing edge for the flange frame mounted on each section. To this effect, the flange frame is slipped on the one end of the pipe section, and the respective edge is bent outward to form an encircling border on which the flange frame can be braced. The operation is then repeated at the other end of the pipe section.

A modified version of the invention is characterized by the fact that the flange frame is joined to the pipe wall by butt welding.

A further modification is characterized by the fact that the flange frame sleeve which rests on the circumference of the pipe section has been doubled by folding back on itself and, thus, results in a jacket into which the end of the pipe section can be fitted.

Finally, it is significant that the individual piping sections are provided with reinforcing bands which completely encircle the piping. Between two such reinforcing bands, additional reinforcing strips are provided which only extend across the corner sections.

These reinforcing strips, located on the corner regions, according to the invention serve to provide additional torsional rigidity for each individual pipe section so that the flange frame can be slipped onto, or mounted on, each section.

Other objects, advantages, and applications of the present invention will become apparent to those skilled in the art of pipe constructions when the accompanying description of several examples of the best modes contemplated for practicing the invention is read in conjunction with the accompanying drawing.

BRIEF DESCRIPTION OF THE DRAWING

The attached drawing provides descriptive information as to specific examples of the invention, wherein like reference numerals refer to like components throughout the several views and wherein.

DESCRIPTION OF THE PREFERRED EMBODIMENTS

Figure 1:
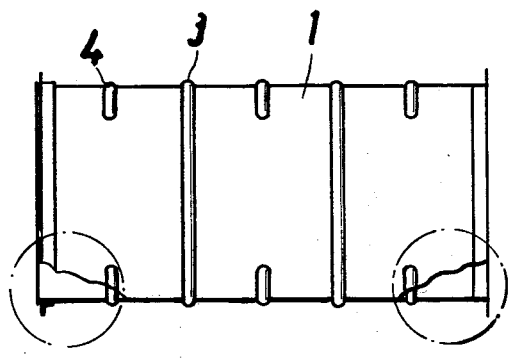
FIG. 1 is a schematic illustration of an individual pipe section with installed flange rings.
Figure 2:
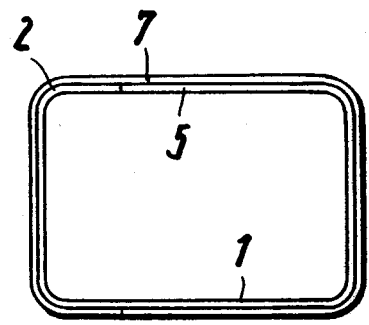
FIG. 2 is a side view of FIG. 1.

Referring now to FIGS. 1 and 2 of the drawing wherein there is illustrated one example of the present invention in the form of an individual pipe section 1 of rectangular cross-section, where each corner is formed by a radius of curvature of such dimension that by bending the edge outward a contiguous, encircling flange-like surface 5 is formed. Each individual pipe section 1 is provided with encircling reinforcing bands 3. Additional reinforcing strips 4, extending only across the corner regions and between the bands 3, provide each section with an absolute torsional stiffness so that flange frames 6, 8, or 10 can be joined to the individual pipe section 1 without difficulty.

Figure 3:
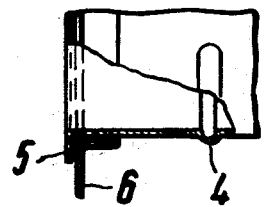
FIG. 3 is an enlarged partially sectioned front view of FIG. 1.

As is shown in FIG. 3, on the individual pipe section 1 the encircling, outward directed flange-like edge 5 serves as a bracing surface for the flange frame 6 which, in turn, consists of an angle piece which has been bent four times in accordance with the radii of curvature 2. The touching ends of the angle piece are joined to each other by a welded seam 7 so that a contiguous encircling frame results. The frame is mounted on the individual pipe section prior to bending back flange-like edge 5 and is braced against the flange-like edge 5.

Figure 4:
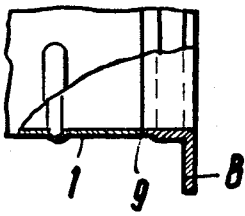
FIG. 4 is an enlarged partially sectioned front view similar to FIG. 1 detailing a modified version.

According to FIG. 4, a similarly formed flange frame 8 is joined by butt welding 9 with the individual pipe section 1.

Figure 5:
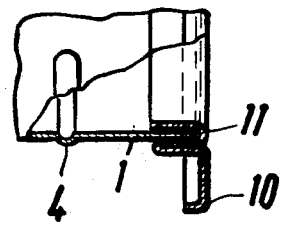
FIG. 5 is an enlarged partially sectioned front view similar to FIG. 4 of an additional modified version.

FIG. 5 shows a flange frame 10 of a different profile construction. In this case two legs are bent back on themselves parallel to the exterior wall of the individual pipe section so that a sleeve 11 is formed into which the end of the pipe section 1 can be pushed.

It is also possible to join several individual pipe sections 1 by spot welding of their flanged edges 5 to form a piping segment. The individual segments can thus be joined together by mounting at their respective ends the flange frames 6 or 8 resulting in the total pipe conduit.

It should be understood by those skilled in the art of pipe constructions that other forms of the present invention can be had, all coming within the spirit of the invention and the scope of the appended claims.

What is claimed is as follows:

1. A piping system comprising individual pipe sections, each pipe section having a rectangular cross-section, the opposite ends of each pipe section having corner areas with a curvature of radius which allows for a contiguous, outwardly directed edge defining a flange formed by bending the ends of each pipe section;

frames for joining the individual pipe sections, each frame being adjacent an end edge flange and snugly fitting the outside wall of each individual pipe section, said frames, each being formed by bending a continuous L-shaped angle iron piece to conform to the peripheral contour of the outside wall of said pipe section such that said bent continuous L-shaped angle iron piece has corner areas with a curvature of radius that conforms to the corner areas of said pipe section and the opposing ends of said angle iron piece are in abutment, said frame ends being welded, one leg of said angle iron piece being adjacent to and parallel with said outside wall, while the other leg of said angle iron piece is adjacent to and parallel with said flange;

a first plurality of longitudinally spaced reinforcing bands encircling each pipe section; and a second plurality of reinforcing bands located between said first reinforcing bands and covering only said corner areas for providing torsional stiffness to said pipe section.

* * * * *